United States Patent
Moridi

(10) Patent No.: US 11,551,097 B2
(45) Date of Patent: Jan. 10, 2023

(54) SYSTEM AND METHOD FOR UTILIZING WEAK SUPERVISION AND A GENERATIVE ADVERSARIAL NETWORK TO IDENTIFY A LOCATION

(71) Applicant: Honda Motor Co., Ltd., Tokyo (JP)

(72) Inventor: Armin Moridi, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 599 days.

(21) Appl. No.: 16/720,566

(22) Filed: Dec. 19, 2019

(65) Prior Publication Data

US 2021/0192356 A1 Jun. 24, 2021

(51) Int. Cl.
*G06N 3/08* (2006.01)
*G06N 3/04* (2006.01)

(52) U.S. Cl.
CPC ........... *G06N 3/088* (2013.01); *G06N 3/0454* (2013.01)

(58) Field of Classification Search
None
See application file for complete search history.

(56) References Cited

U.S. PATENT DOCUMENTS

| | | | |
|---|---|---|---|
| 10,949,997 B2 * | 3/2021 | Houts | G06V 10/82 |
| 2021/0383209 A1 * | 12/2021 | Brahma | G06N 3/08 |

* cited by examiner

*Primary Examiner* — Daniel C Puentes
(74) *Attorney, Agent, or Firm* — Rankin, Hill & Clark LLP

(57) ABSTRACT

A system and method for utilizing weak supervision and a generative adversarial network to identify a location that includes receiving location data and time based data associated with locations of a vehicle and analyzing the location data and the time based data to filter noisy data associated with the locations of the vehicle. The system and method also include determining a plurality of labeling functions that are associated with at least one center point that is associated with a point of interest location that is regularly visited by the vehicle and the time based data. The system and method further include inputting the plurality of labeling functions to the generative adversarial network to train at least one model of the generative adversarial network to identify the point of interest location that is regularly visited by the vehicle.

20 Claims, 6 Drawing Sheets

SYSTEM AND METHOD FOR UTILIZING WEAK SUPERVISION AND A GENERATIVE ADVERSARIAL NETWORK TO IDENTIFY A LOCATION

BACKGROUND

Currently the advent of deep learning/machine learning is being utilized to provide artificial intelligence that may be utilized in various environments. For instance, deep learning/machine learning may be utilized with respect to vehicular environments and the analysis of one or more data inputs to output data points that may provide and/or optimize one or more features or functions. However, training of a neural network may include a complex process that may require many human hours for annotators to provide various data points that may be related to a large variety of information that may pertain to the vehicular environments. Additionally, training of the neural network may involve the execution of one or more complex algorithms that may need to be tested, executed, and re-tested to find one or more sets of weights to best map inputs to outputs.

BRIEF DESCRIPTION

According to one aspect, a computer-implemented method for utilizing weak supervision and a generative adversarial network to identify a location that includes receiving location data and time based data associated with locations of a vehicle and analyzing the location data and the time based data to filter noisy data associated with the locations of the vehicle. At least one center point that is associated with a point of interest location that is regularly visited by the vehicle is determined and utilized for weak supervision. The computer-implemented method also includes determining a plurality of labeling functions that are associated with the at least one center point and the time based data. The computer-implemented method further includes inputting the plurality of labeling functions to the generative adversarial network to train at least one model of the generative adversarial network to identify the point of interest location that is regularly visited by the vehicle.

According to another aspect, a system for utilizing weak supervision and a generative adversarial network to identify a location that includes a memory storing instructions when executed by a processor cause the processor to receive location data and time based data associated with locations of a vehicle and analyze the location data and the time based data to filter noisy data associated with the locations of the vehicle. At least one center point that is associated with a point of interest location that is regularly visited by the vehicle is determined and utilized for weak supervision. The instructions also cause the processor to determine a plurality of labeling functions that are associated with the at least one center point and the time based data. The instructions further cause the processor to input the plurality of labeling functions to the generative adversarial network to train at least one model of the generative adversarial network to identify the point of interest location that is regularly visited by the vehicle.

According to yet another aspect, a non-transitory computer readable storage medium storing instructions that when executed by a computer, which includes a processor perform a method that includes receiving location data and time based data associated with locations of a vehicle and analyzing the location data and the time based data to filter noisy data associated with the locations of the vehicle. At least one center point that is associated with a point of interest location that is regularly visited by the vehicle is determined and utilized for weak supervision. The method also includes determining a plurality of labeling functions that are associated with the at least one center point and the time based data. The method further includes inputting the plurality of labeling functions to a generative adversarial network to train at least one model of the generative adversarial network to identify the point of interest location that is regularly visited by the vehicle.

DETAILED DESCRIPTION

Figure 1:
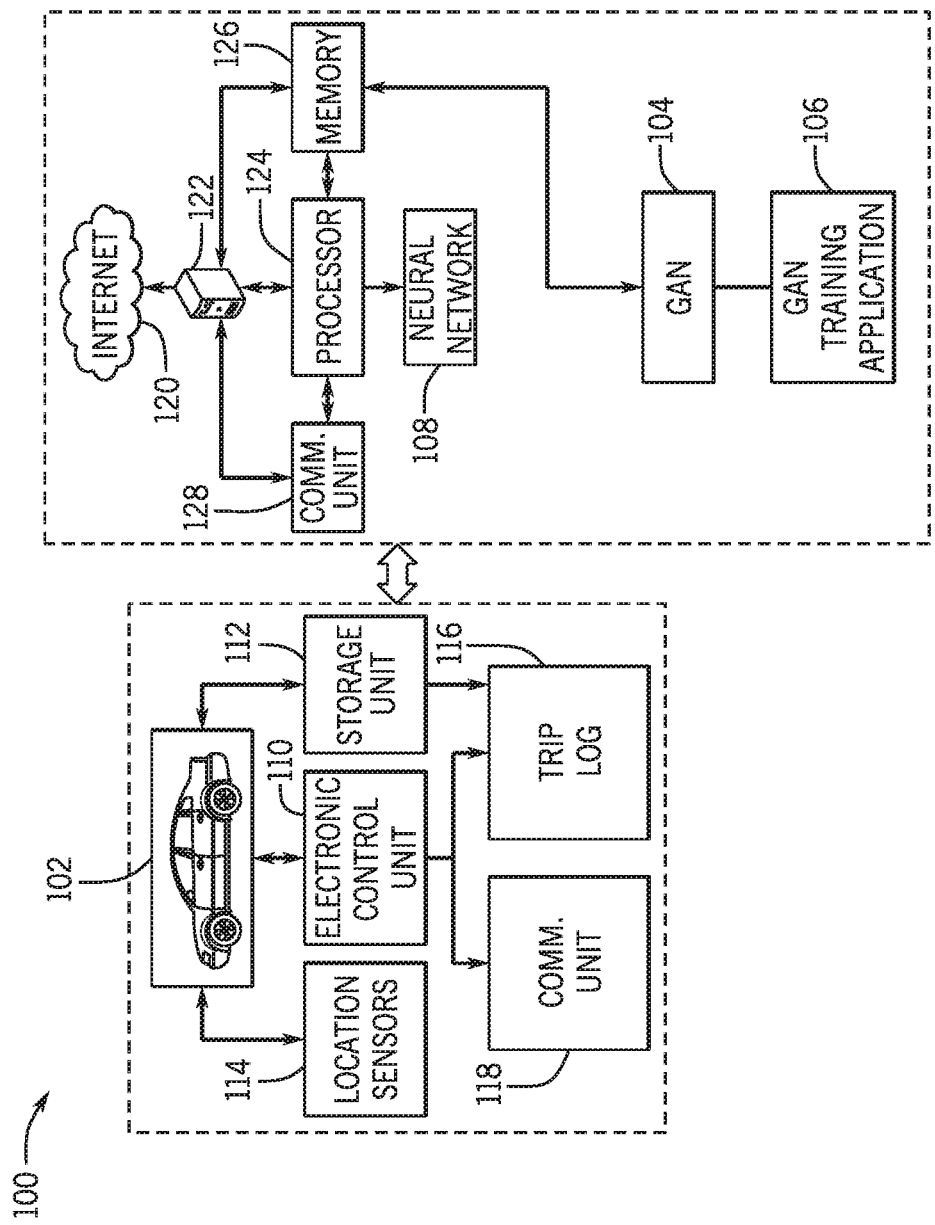
FIG. 1 is a schematic view of an exemplary system for utilizing weak supervision and a generative adversarial network to identify a location of a vehicle.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein may be, for example, a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

A "memory", as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring to the drawings, wherein the showings are for purposes of illustrating one or more exemplary embodiments and not for purposes of limiting the same, FIG. 1 is a schematic view of an exemplary system 100 for utilizing weak supervision and a generative adversarial network (GAN) 104 to identify a location of a vehicle 102. The components of the system 100, as well as the components of other systems, hardware architectures, and software architectures discussed herein, may be combined, omitted, or organized into different architectures for various embodiments.

Generally, the system includes a GAN training model application (GAN training application) 106 that may utilize weak supervision and the GAN 104 to train one or more deep neural networks 108 to identify a location of a vehicle 102. For purposes of simplicity, this disclosure will describe the embodiments of the system 100 with respect to training one or more deep neural networks 108 to identify a regularly visited point of interest locations (regularly visited locations) (e.g., home, work, school, gym) of a vehicle occupant (e.g., owner, driver, etc.) (not shown). In some configurations, the system 100 may be utilized to train the deep neural network(s) 108 to identify one or more regularly visited locations of the vehicle occupant based on parking of the vehicle 102 at one or more respective locations.

In an exemplary embodiment, the GAN training application 106 may be configured to communicate with components of the vehicle 102 to receive location based data and time based data associated with trips of the vehicle 102. The GAN training application 106 may determine when the vehicle 102 is parked at a particular location and may further determine locational coordinates (e.g., GPS coordinates, DGPS coordinates, GNSS coordinates, etc.) that may pertain to one or more parking locations of the vehicle 102. The application 106 may be configured to update a trip log 116 with the locational coordinates and time based data that may be associated with the arrival of the vehicle 102 at the respective location, the parking of the vehicle 102 at the respective location, and/or the departure of the vehicle 102 from the respective location.

As discussed in more detail below, the GAN training application 106 may be configured to analyze the trip log 116 to filter noisy data outliers associated with the one or more locational coordinates that may be associated with locations that may not be regularly visited by the vehicle occupant and consequently the vehicle 102. The application 106 may also fine tune locational coordinate accuracy (e.g., GPS accuracy) with respect to regularly visited locations such as the home location of the vehicle occupant. In particular, the GAN training application 106 may be configured to execute the DBSCAN algorithm that may reduce a spatial data set size of locational coordinate data points and may aggregate remaining locational coordinate data points that are associated with regularly visited locations as center points of clusters of locational coordinate data points. The center points of the clusters may be associated with one or more particular locations that may be regularly visited by the vehicle occupant and consequently the vehicle 102 such as the home location.

As discussed below, the GAN training application 106 may be configured to determine a plurality of labeling functions that may be associated with the center points to analyze locations visited by the vehicle 102 based on one or more respective parking locations of the vehicle 102 and associated time based data. In an exemplary embodiment, the GAN training application 106 may be configured to input the plurality of labeling functions to the GAN 104 to tune parameters associated with the labeling functions and to utilize a generative model to set probabilistic labels that may pertain to two classes pertaining to the regularly visited location of the vehicle occupant or a non-regularly visited location.

In an exemplary embodiment, the GAN training application 106 may be configured to input the probabilistic labels to train a discriminative classification model of the GAN 104 that may be utilized by the deep neural network(s) 108. The deep neural network(s) 108 may thereby be trained through the discriminative classification model to identify the regularly visited location of the vehicle 102 without tedious manual pre-training of the deep neural network(s) 108.

With continued reference to FIG. 1, the vehicle 102 may include an electronic control unit (ECU) 110. The ECU 110 may execute one or more applications, operating systems, vehicle system and subsystem executable instructions, among others. In one or more embodiments, the ECU 110 may include a microprocessor, one or more application-specific integrated circuit(s) (ASIC), or other similar devices. The ECU 110 may also include an internal processing memory, an interface circuit, and bus lines for transferring data, sending commands, and communicating with the plurality of components of the vehicle 102.

In some configurations, the ECU 110 may include a respective communication device (not shown) for sending data internally to components of the vehicle 102 and communicating with externally hosted computing systems (e.g., external to the vehicle 102). Generally the ECU 110 may be operably connected to the storage unit 112 and may communicate with the storage unit 112 to execute one or more applications, operating systems, vehicle systems and subsystem user interfaces, and the like that are stored on the storage unit 112.

In one or more embodiments, the ECU 110 may be configured to operably control the plurality of components of the vehicle 102. The ECU 110 may also provide one or more commands to one or more control units (not shown) of the vehicle 102 including, but not limited to, a motor/engine control unit, a braking control unit, a turning control unit, a transmission control unit, and the like to control the vehicle 102 to be autonomously operated. In some configurations, the ECU 110 may execute instructions to control one or more components of the vehicle 102 to autonomously control the vehicle 102 to reach one or more destinations that may include one or more regularly visited locations based on the training of the deep neural network(s) 108.

In one or more embodiments, the storage unit 112 may configured to store data that may be output by one or more components of the vehicle 102, including, but not limited to location sensors 114 of the vehicle 102. In particular, the storage unit 112 may be configured to store the trip log 116 that may be populated with locational coordinates of one or more locations that may be visited by the vehicle 102 based on one or more respective parking locations of the vehicle 102. The trip log 116 may be configured as a relational database that may include records that pertain to location data and time based data associated with locations of the vehicle 102. In particular, the records may include one or more fields that may be populated with data that may be associated with one or more parking locations at which the vehicle 102, one or more time stamps (e.g., data packets) associated with the date, the day, and/or the time of arriving and/or parking at or departing from one or more respective parking locations, the duration of parking at one or more respective parking locations, and/or additional data that may pertain to the usage of doors, trunk, alarm, etc. that may occur during parking of the vehicle 102.

In an exemplary embodiment, the location sensors 114 may be configured as GPS sensors, DGPS sensors, GNSS sensors, and the like and may be configured to determine GPS coordinates, DGPS coordinates, and/or GNSS coordinates associated with one or more locations of the vehicle 102. The GAN training application 106 may be configured to communicate with the location sensors 114 to determine location data that includes locational coordinates that are associated with particular parking locations of the vehicle 102 and may be configured to populate the trip log 116 with the locational coordinates associated with the particular parking locations of the vehicle 102.

As discussed below, the GAN training application 106 may be configured to determine when the vehicle 102 is parked at a particular location based on a transmission mode (e.g., park transmission mode) of the vehicle 102 and/or an ignition state (e.g., ON/OFF) status of the vehicle 102. In particular, the GAN training application 106 may be configured to communicate with the ECU 110 to determine timestamps (e.g., time and date information) that may be associated with a transmission status change and/or an ignition state change to thereby determine time based data associated with the parking and/or departure of the vehicle 102 with respect to the particular parking locations that may also be populated to the trip log 116.

In one configuration, the GAN training application 106 may be configured to utilize the DBSCAN algorithm to reduce the spatial dataset size of the trip log 116 and may aggregate data points that include the locational coordinates that correspond to one or more particular locations that are provided by the location sensors 114. Accordingly, location data that may be utilized for determining the plurality of labeling functions may be robust and fine-tuned for accuracy.

In one embodiment, the ECU 110 may also be operably connected to a communication unit 118 of the vehicle 102. The communication unit 118 may be operably connected to one or more transceivers (not shown) of the vehicle 102. The communication unit 118 may be configured to communicate through an internet cloud 120 through one or more wireless communication signals that may include, but may not be limited to Bluetooth® signals, Wi-Fi signals, ZigBee signals, Wi-Max signals, and the like.

In one embodiment, the communication unit 118 may be configured to connect to the internet cloud 120 to send and receive communication signals to and from an external server 122. In one configuration, the external server 122 may host the GAN 104 and the deep neural network(s) 108. The external server 122 may be operably controlled by a processor 124 of the external server 122. The processor 124 may be configured to operably control the components of the external server 122 and process information communicated to the external server 122 by the vehicle 102 and/or the GAN training application 106. In one or more embodiments, the processor 124 may be configured to execute the GAN training application 106 based on one or more executable files of the application 106 that may be stored on a memory 126 of the external server 122.

In one or more embodiments, the memory 126 may also store one or more operating systems, applications, associated operating system data, application data, executable data, and the like. The memory 126 may additionally store one or more datasets (not shown) that may be trained by the GAN training application 106 and may be utilized by the deep neural network(s) 108. In some cases, such datasets may not require manual pre-training but may be trained in real-time to be accessed by the deep neural network(s) 108 based on the execution of the GAN training application 106.

In one embodiment, the processor 124 of the external server 122 may additionally be configured to communicate with a communication unit 128 of the external server 122. The communication unit 128 may be configured to communicate through the internet cloud 120 through one or more wireless communication signals that may include, but may not be limited to Bluetooth® signals, Wi-Fi signals, ZigBee signals, Wi-Max signals, and the like. In one embodiment, the communication unit 128 may be configured to connect to the internet cloud 120 to send and receive communication signals to and from the vehicle 102. The communication signals may include data that pertains to the locational coordinates of the vehicle 102 as provided by the location sensors 114 and/or additional data that may be provided by the ECU 110 of the vehicle 102. Additionally, the communication signals may include data that may be retrieved from the trip log 116 stored on the storage unit 112 of the vehicle 102.

II. The GAN Training Application and Related Methods

The components of the GAN training application 106 will now be described according to an exemplary embodiment and with reference to FIG. 1. In an exemplary embodiment, the GAN training application 106 may be stored on the memory 126 and executed by the processor 124 of the external server 122. In another embodiment, the GAN training application 106 may be stored on the storage unit 112 of the vehicle 102 and may be executed by the ECU 110 of the vehicle 102.

Figure 2:
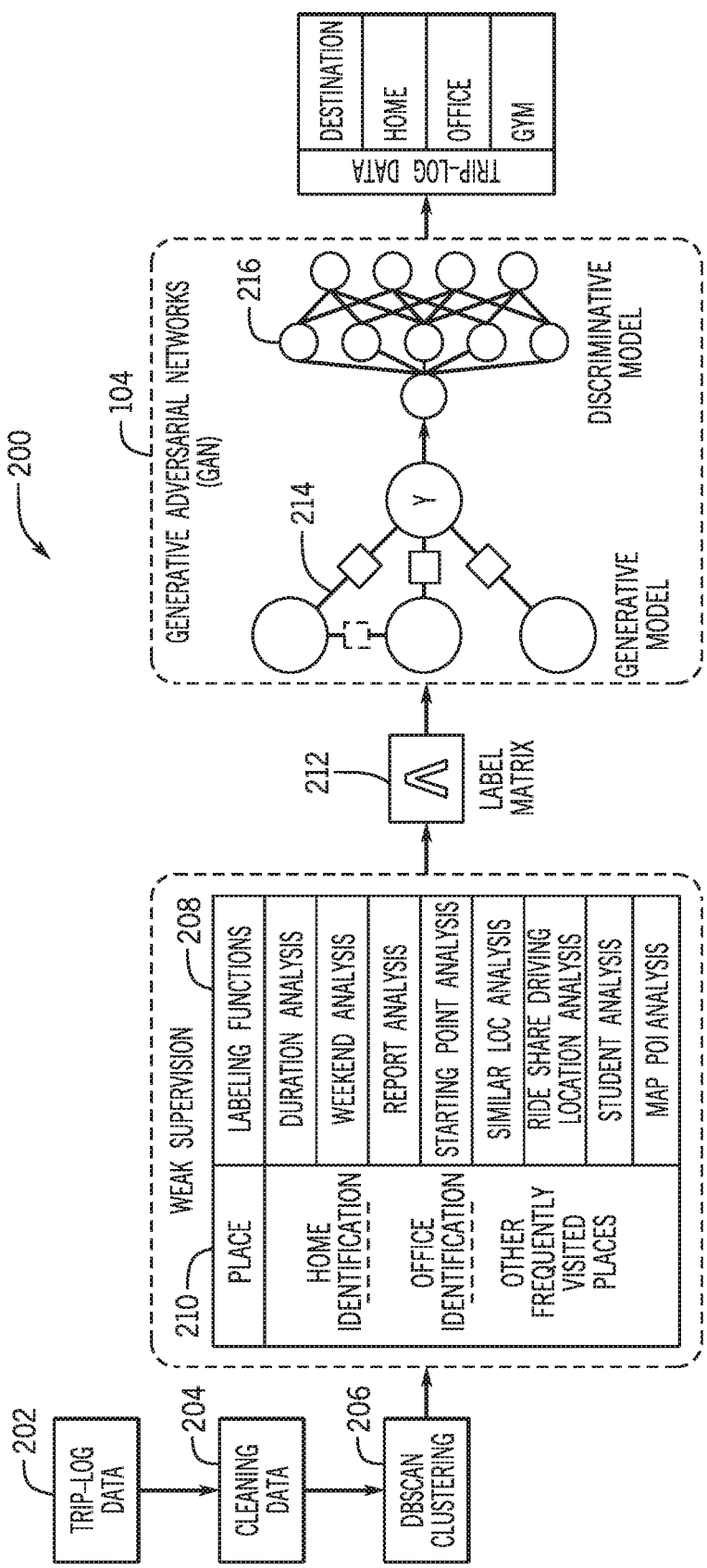
FIG. 2 is a schematic overview of the processes executed by the GAN training application according to an exemplary embodiment of the present disclosure.

FIG. 2 is a schematic overview of the processes 200 executed by the GAN training application 106 according to an exemplary embodiment of the present disclosure. The GAN training application 106 may populate the trip log 116 with trip log data 202. As discussed below in more detail, the trip log data 202 may be analyzed and data cleaning 204 may be completed by the GAN training application 106 to remove noisy data and outliers and to tune locational coordinate accuracy of the location sensors 114. As discussed below, the GAN training application 106 may be configured to execute a density based spatial clustering of applications with noise algorithm (DBSCAN) to perform clustering 206 that may reduce a spatial data set size of locational coordinate data points and may aggregate remaining locational coordinate data points that are associated with regularly visited locations as center points of clusters of locational coordinate data points.

The GAN training application 106 may be further configured to determine a plurality of labeling functions 208 based on the input of cleaned data within a weak supervision step. The plurality of labeling functions 208 may be associated with locations visited by the vehicle 102 that may be determined based on the analysis of the cleaned data. The GAN training application 106 may be configured to examine the plurality of labeling functions 208 that pertain to the identification of respective regularly visited locations 210 that are determined during the weak supervision step to prepare weak learners.

As shown, some exemplary regularly visited locations may include a home location and an office location. However, it is appreciated that one or more additional point of interest locations that may be regularly visited by the vehicle occupant may be analyzed during the weak supervision step. Additionally, as shown some labeling functions may include, but may not be limited to, durational analysis, weekend analysis, repeat analysis, and starting point analysis as discussed in exemplary embodiments below. However, it is to be appreciated that additional labeling functions may be computed. For example, as shown, additional labeling functions may include, but may not be limited to, similar location analysis, ride share driving location analysis, student analysis, and/or map point of interest analysis.

In an exemplary embodiment, the GAN training application 106 may be configured to input the plurality of labeling functions 208 to a label matrix 212 that may store all of the labeling functions 208 respectively. Accordingly, the label matrix 212 may include results of each of the labeling functions 208 respectively. The label matrix 212 may enable efficient learning of overlaps between various labeling functions. In one embodiment, the labeling functions 208 may be inputted from the label matrix 212 to the GAN 104. The GAN 104 and may aggregate the plurality of labeling functions to thereby tune parameters associated with the plurality of labeling functions.

In particular, the plurality of labeling functions may be inputted to a generative model 214 of the GAN 104 to be aggregated and analyzed to thereby determine probability labels associated with two or more classes. For purposes of simplicity, this disclosure will utilize two classes as "regularly visited location" or "not regularly visited location" with respect to the probability associated with the location of the vehicle 102 being at the regularly visited location or not being located at the regularly visited location.

In one configuration, the generative model 214 may output one or more sets of probabilistic labels associated with the classes to the discriminative model 216 for training. The discriminative model 216 may be configured to re-weigh a combination of the labeling functions and further train the deep neural network(s) 108 with respect to the regularly visited location of the vehicle occupant. Stated differently, data that may be trained may be utilized to determine when the vehicle 102 is located at or is parked at the regularly visited location of the vehicle occupant without tedious pre-training of the deep neural network(s) 108.

Figure 3:
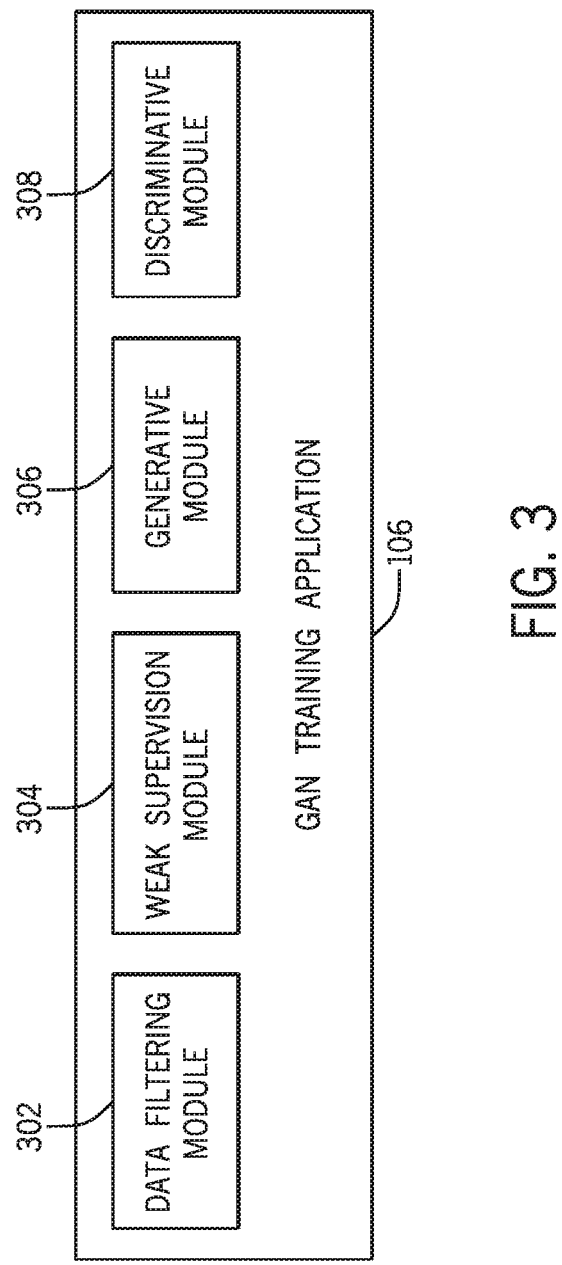
FIG. 3 is a schematic overview of a plurality of modules of the GAN training application according to an exemplary embodiment of the present disclosure.

FIG. 3 is a schematic overview of a plurality of modules 302-308 of the GAN training application 106 according to an exemplary embodiment of the present disclosure. In an exemplary embodiment, the GAN training application 106 may include a data filtering module 302, a weak supervision module 304, a generative module 306, and a discriminative module 308. However, it is to be appreciated that the GAN training application 106 may include one or more additional modules and/or sub-modules that are included in addition to the modules 302-308.

Figure 4:
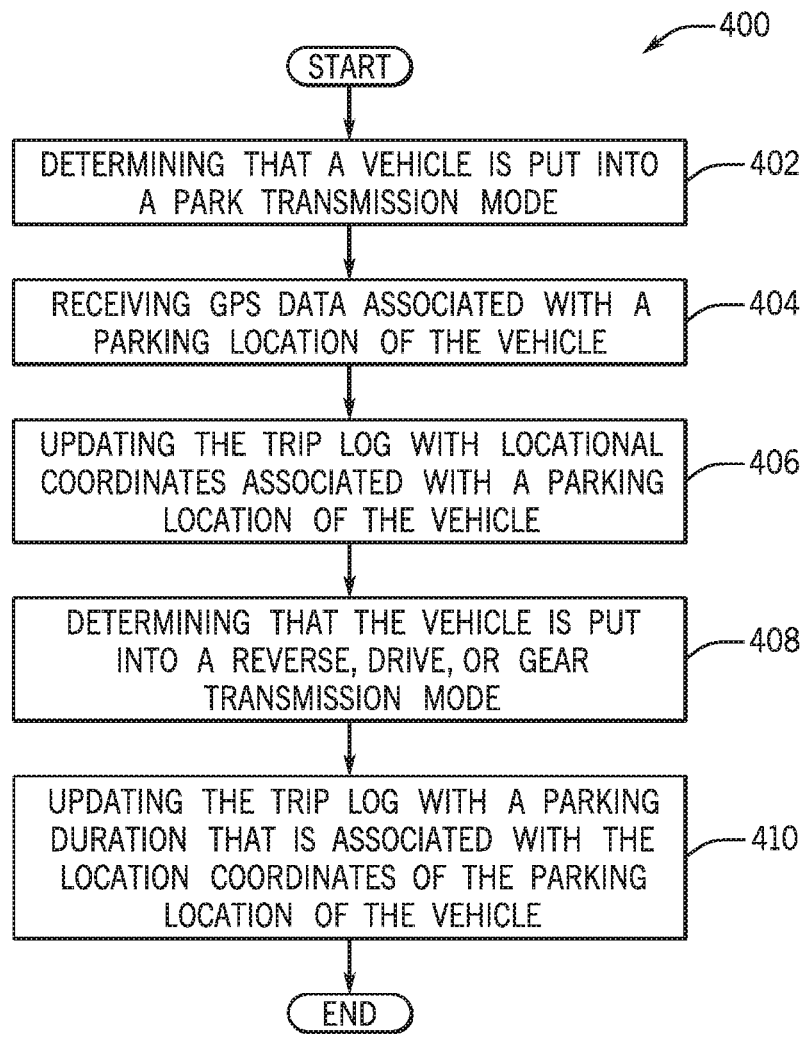
FIG. 4 is a process flow diagram for updating a trip log with locational information and filtering data from the trip log to determine filtered trip data according to an exemplary embodiment of the present disclosure.

FIG. 4 is a process flow diagram for updating the trip log 116 with locational information according to an exemplary embodiment of the present disclosure. FIG. 4 will be described with reference to the components of FIG. 1, FIG. 2, and FIG. 3, through it is to be appreciated that the method 400 of FIG. 4 may be used with other systems/components. The method 400 may begin at block 402, wherein the method 400 may include determining that a vehicle 102 is put into a park transmission mode.

In an exemplary embodiment, the data filtering module 302 of the GAN training application 106 may be configured to communicate with the ECU 110 to determine an enablement state of the ignition of the vehicle 102. The ECU 110 may be configured to communicate the enablement state of the ignition of the vehicle 102 as enabled or disabled each time the ignition state of the vehicle 102 changes. In one embodiment, upon determining that the ignition state, if the vehicle 102 is in an enabled state, the data filtering module 302 may communicate with the ECU 110 to determine when the vehicle 102 is put into a park transmission mode. The ECU 110 may be configured to communicate with a transmission control unit (not shown) of the vehicle 102 to determine when the vehicle 102 is put into the park transmission mode (from a drive transmission mode, a reverse transmission mode, or a manual gear selection) and may thereby communicate respective data to the data filtering module 302. The data filtering module 302 may accordingly determine that the vehicle 102 is put into the park transmission mode.

The method 400 may proceed to block 404, wherein the method 400 may include receiving GPS data associated with a parking location of the vehicle 102. In an exemplary embodiment, upon determining that the vehicle 102 is put into the park transmission mode, the data filtering module 302 may be configured to communicate with the location sensors 114 of the vehicle 102 to determine the locational coordinates of the vehicle 102. The locational coordinates may be utilized to pin point a particular parking location of the vehicle 102.

The data filtering module 302 may be additionally be configured to communicate with the ECU 110 to determine if/when the ignition of the vehicle 102 is disabled. The ECU 110 may be configured to determine when the ignition state of the ignition is changed from an enabled state to a disabled state (e.g., based on the vehicle occupant turning off the ignition of the vehicle 102). Accordingly, the ECU 110 may be configured to communicate data pertaining to the disablement of the ignition of the vehicle 102 to the data filtering module 302. Upon determining that the ignition of the vehicle 102 is disabled, the data filtering module 302 may communicate with the ECU 110 to determine a timestamp associated with the disablement of the ignition. The ECU 110 may be configured to include a system clock that may output a timestamp (e.g., date, day, hour, minute, second) that is associated with the disablement of the ignition.

The method 400 may proceed to block 406, wherein the method 400 may include updating the trip log 116 with locational coordinates associated with the parking location of the vehicle 102. In one embodiment, upon determining the location coordinates associated with the parking location of the vehicle 102 based on location data communicated by the location sensors 114, the data filtering module 302 may be configured to access the trip log 116 stored on the storage unit 112 of the vehicle 102. As discussed above, the trip log 116 may be configured as a relational database that may include records that pertain to one or more instances during which the vehicle 102 parked. The records may include one or more fields that may be populated with data and may be associated with one or more locations at which the vehicle 102 may be parked, the date, the day, and/or the time of arriving and/or parking at or departing from one or more respective parking locations, the duration of parking at one or more parking locations, and/or additional data that may pertain to the usage of doors, trunk, alarm, etc. that may occur during parking of the vehicle 102.

In one embodiment, the data filtering module 302 may be configured to query the trip log 116 to determine if a record already exists that includes the locational coordinates associated with the respective parking location of the vehicle 102. If it is determined that a record already exists that includes the locational coordinates associated with the parking location of the vehicle 102, the data filtering module 302 may be configured to update the record with the particular instance of the vehicle 102 parking at the respective parking location. The record may also be updated with the timestamp associated with the disablement of the ignition of the vehicle 102. If it is determined that the record does not exist that includes the locational coordinates associated with the parking location of the vehicle 102, the data filtering module 302 may be configured to create a new record upon the trip log 116 that includes the locational coordinates associated with the parking location of the vehicle 102. The new record may also be updated with the timestamp associated with the disablement of the ignition of the vehicle 102.

The method 400 may proceed to block 408, wherein the method 400 may include determining that the vehicle 102 is put into a reverse, drive, or gear transmission mode (e.g., based on a manual gear shift). In an exemplary embodiment, the ECU 110 of the vehicle 102 may be configured to communicate with the data filtering module 302 when it is determined that the ignition state of the vehicle 102 is changed from a disabled state to an enabled state. In one configuration, upon determining that the ignition state of the vehicle 102 is in the enabled state, the data filtering module 302 may be configured to communicate with the ECU 110 to determine when the vehicle 102 is put into a reverse transmission mode, a drive transmission mode, or a gear transmission mode.

Upon determining that the ignition state is changed from the disabled state to an enabled state and the vehicle 102 is put into the reverse transmission mode, the drive transmission mode, or the gear transmission mode, the data filtering module 302 may be configured to communicate with the ECU 110 to determine a timestamp associated with the enablement of the ignition. The system clock of the ECU 110 may output the timestamp (e.g., day, date, hour, minute, second) that is associated with the shift in transmission mode. In one embodiment, the data filtering module 302 may additionally access the trip log 116 and may further update the record that includes the locational coordinates associated with the parking location of the vehicle 102 with the timestamp associated with the shift in transmission mode of the vehicle 102 to indicate the departure of the vehicle 102 from the parking location.

The method 400 may proceed to block 410, wherein the method 400 may include updating the trip log 116 with a parking duration that is associated with the locational coordinates of the parking location of the vehicle 102. In one embodiment, the data filtering module 302 may calculate the parking duration as a time that the vehicle 102 is parked at the parking location. The duration may be calculated by the data filtering module 302 as a difference in time between the timestamp associated with the disablement of the ignition and the timestamp associated with the shift in transmission mode from the park transmission mode to a reverse, drive, or gear transmission mode of the vehicle 102.

Upon determining the parking duration of the vehicle 102, the data filtering module 302 may be configured to access the trip log 116 and update the record associated with the locational coordinates of the parking location of the vehicle 102 and the parking duration of the vehicle 102. It is to be appreciated that the data filtering module 302 may execute the blocks 402-410 each time the vehicle 102 is determined to be parked. In other words, the data filtering module 302 may populate the trip log 116 each time the vehicle 102 is determined to be parked with respect to location data and time based data associated with the current parking location of the vehicle 102.

Figure 5:
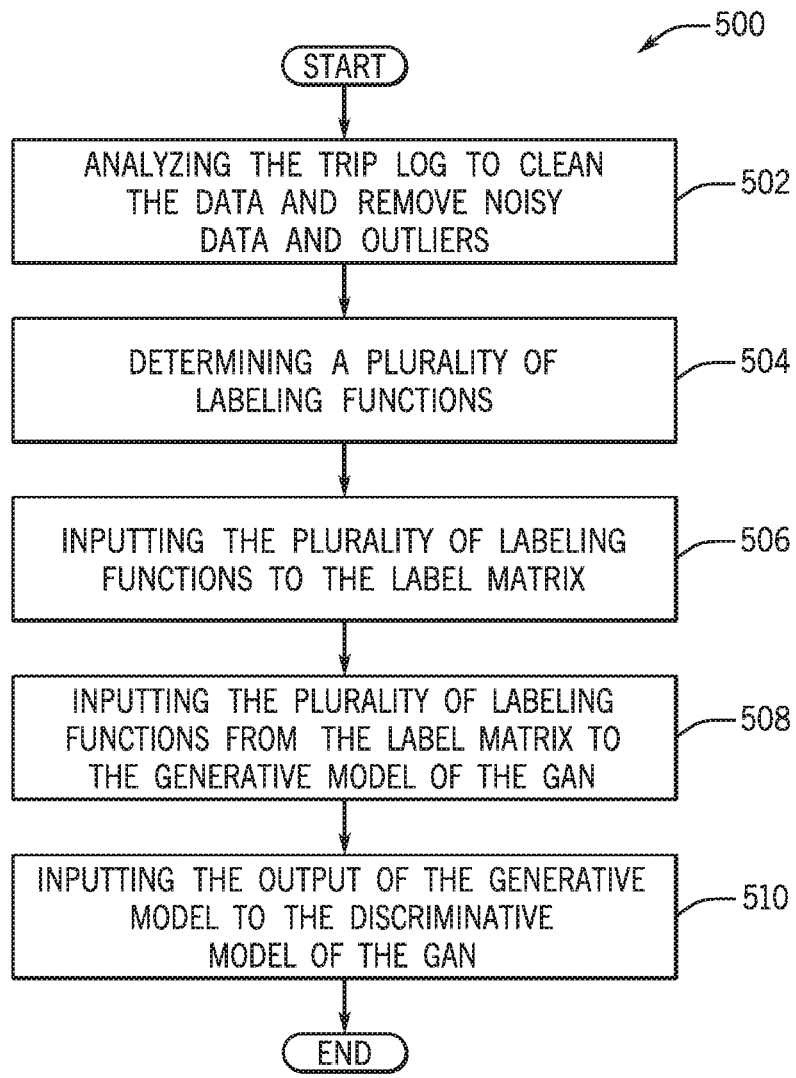
FIG. 5 is a process flow diagram of a method for determining a plurality of labeling functions that are associated with the center point and inputting the plurality of labeling functions to the generative adversarial network according to an exemplary embodiment of the present disclosure.

FIG. 5 is a process flow diagram of a method 500 for determining filtering data and determining a plurality of labeling functions that are associated with the center point and inputting the plurality of labeling functions to the GAN 104 according to an exemplary embodiment of the present disclosure. FIG. 5 will be described with reference to the components of FIG. 1, FIG. 2, and FIG. 3, through it is to be appreciated that the method 500 of FIG. 5 may be used with other systems/components. The method 500 may be executed to provide a weak supervision setting that utilizes unlabeled data $X_u = x_1, \ldots, x_N$. The weak supervision setting may include one or more weak supervision sources $p_i(y|x)$, i=1:M.

The weak supervision module 304 may be configured to set a coverage set $C_i$, which is the set of points xx over which it is defined and an accuracy which is defined as an expected probability of the true label y* over its coverage set (e.g., <1.0). The weak supervision module 304 may utilize an open-source system that may be known in the art, such as Snorkel, for efficiently assembling training data through the weak supervision. For example, Snorkel may be utilized to create the plurality of labeling functions, which are then used to label data that pertains to particular point of interest locations.

The method 500 may begin at block 502, wherein the method 500 may include analyzing the trip log to clean the data and remove noisy data and outliers. In one embodiment, the data filtering module 302 may be configured to access the trip log 116 to analyze the records associated with the locational coordinates of the parking locations of the vehicle 102 to determine locational coordinates in the form of data points that are visited by the vehicle 102 that fall below a threshold number of visits for a period of time (e.g., three visits per week). Such data points may include locational coordinates that may pertain to parking locations that are near locations that may not be regularly visited by the vehicle 102. Accordingly, the data filtering module 302 may classify such data points as outliers (e.g., noise) that may be filtered (e.g., removed) from further analysis.

In an exemplary embodiment, the data filtering module 302 may be configured to execute the DBSCAN algorithm that may reduce a spatial data set size and may aggregate data points that include locational coordinates that correspond to one or more regularly visited locations of the vehicle occupant. Stated differently, if locational coordinates are skewed at one or more points in time or the vehicle 102 is parked at one or more particular parking locations (e.g., parking spots) that are located near one or more regularly visited locations, the trip log 116 may include data points with different locational coordinates that may actually pertain to the regularly visited location (e.g., different locational coordinates that may pertain to the same location of home, school, office, etc.).

In one embodiment, upon filtering the outliers, the data filtering module 302 may be configured to determine a maximum distance between remaining data points that may include locational coordinates that are associated with parking locations that fall above the threshold number of visits for a period of time and may be within a threshold distance of one another. Accordingly, the data filtering module 302 may compare each of the remaining (non-filtered) data points that include locational coordinates to one another to determine if they are within the threshold distance (e.g., 150 meters) of one another.

In an exemplary embodiment, the data filtering module 302 may determine center points of a cluster associated with a particular location by determining a number of samples in a neighborhood for a set of locational coordinates. The center points of each cluster may include data points that include locational coordinates that may be associated with a regularly visited location of the vehicle 102. In other words, the center points of clusters may be determined with respect to locational coordinates that are associated with a regularly visited parking locations of the vehicle 102 that may be located within a predetermined vicinity of a particular point of interest location.

One or more techniques, algorithms, and/or processes that are known in the art such as the Haversine formula and a ball-tree data structure may be executed and/or utilized by the data filtering module 302 to compute pointwise distances and find nearest neighbors with respect to one or more locational coordinates that are associated with one or more parking locations of the vehicle 102 that are within the threshold distance of one another.

In one embodiment, the data points associated with locational coordinates associated with the parking locations of the vehicle 102 may be clustered, re-clustered, and analyzed to determine a subset of aggregated locational coordinates that may be within a distance threshold of the center points of a cluster associated with a regularly visited location of the vehicle occupant and/or another regularly visited location. The aggregated locational coordinates may thereby be associated with regularly visited locations of the vehicle 102. The data filtering module 302 may be configured to classify the aggregated locational coordinates that may pertain to a particular point of interest location that may be regularly visited by the vehicle 102 as a center point of a particular cluster that may correspond to the particular point of interest location (e.g., regularly visited location, home location).

In an exemplary embodiment, upon classifying the center point of each cluster that may correspond to the particular point of interest location, the data filtering module 302 may be configured to access the trip log and update the trip log with the respective center point for each record that includes locational coordinates of the parking locations of the vehicle 102 that are associated with the particular point of interest location. For example, the data filtering module 302 may be configured to access the trip log 116 and update the trip log 116 with the respective center point for each record that includes locational coordinates that pertain to parking locations that may be within a vicinity of the home location of the vehicle occupant. Accordingly, each record that includes the locational coordinates of parking locations of the vehicle 102 that are associated with the home location may be updated with the center point aggregated locational coordinates that may pertain to the home location that may be regularly visited by the vehicle 102. In one configuration, upon updating the trip log 116, the data filtering module 302 may communicate data pertaining to the center point to the weak supervision module 304.

The method 500 may begin at block 504, wherein the method 500 may include determining a plurality of labeling functions. One or more exemplary labeling functions will now be discussed below as being determined by the GAN training application 106, however, it is appreciated that additional or alternate labeling functions may be determined by the GAN training application 106. In an exemplary embodiment, the weak supervision module 304 may be configured to access the trip log 116 and may be configured to query the records of the trip log 116 that include one or more locations that may be regularly visited by the vehicle 102. As discussed above, each record that may be associated with a particular point of interest location may include a duration of parking at the parking location that may be associated with the center point aggregated locational coordinates.

In one embodiment, the weak supervision module 304 may be configured to query the records of the trip log 116 that include one or more locations that may be regularly visited by the vehicle 102 to determine durations (e.g., time in hours) that that the vehicle 102 may be parked at each of the one or more point of interest locations that are regularly visited by the vehicle 102. Upon determining the durations that the vehicle 102 may be parked at each of the one or more point of interest locations, the weak supervision module 304 may compute a labeling function that includes vector data points that pertain to aggregated durational values that are associated with one or more regularly visited locations.

In one embodiment, the weak supervision module 304 may be configured to further query the records of the trip log 116 that include one or more point of interest locations that may be regularly visited by the vehicle 102 to determine particular durations of parking locations at particular timeframes (e.g., days of the week, weekends). Upon determining the durations that the vehicle 102 may be parked at each of the one or more point of interest locations during particular timeframes, the weak supervision module 304 may compute a labeling function that includes vector data points that pertain to aggregate durational values associated with particular timeframes that may pertain to one or more regularly visited locations including the home location of the vehicle occupant (e.g., as the vehicle 102 may have the highest period of duration of parking at the home location during particular timeframes such as weekends, nights, or evenings).

In another embodiment, the weak supervision module 304 may be configured to query the records of the trip log 116 that include one or more point of interest locations that may be regularly visited by the vehicle 102 to determine a number of trips that may begin with respect to each center point associated with one or more regularly visited locations. As discussed above, the data filtering module 302 may populate the trip log 116 with timestamps upon the enablement of the ignition of the vehicle 102, the change from the disabled state to an enabled state, and/or the when the vehicle 102 is put into the reverse transmission mode, the drive transmission mode, or the gear transmission mode from the park transmission mode. The weak supervision module 304 may be configured to further query the records of the trip log 116 that include one or more point of interest locations that may be regularly visited by the vehicle 102 to analyze the time stamps to determine the number of times the particular point of interest location is utilized as a starting point location of the vehicle 102 over a period of time (e.g., one month).

Upon determining the number of times that each of the one or more point of interest locations are utilized as a starting point over a period of time, the weak supervision module 304 may compute a labeling function that includes vector data points that pertain to starting point numeric values associated with the number of times each of the one or more regularly visited locations such as the home location of the vehicle occupant that may be utilized as starting points over the period of time (e.g., as the vehicle 102 may have the utilized the home location the highest number of times as a starting point from which trips of the vehicle 102 may have begun during a given month).

In some configurations, the weak supervision module 304 may be configured to further query the records of the trip log 116 that include one or more point of interest locations that may be regularly visited by the vehicle 102 to analyze the time stamps to determine the number of times the particular point of interest location is a starting location of the vehicle 102 at particular timeframes (e.g., morning, afternoon, evening, night).

Upon determining the number of times that each of the one or more point of interest locations are utilized as a starting location at particular timeframes, the weak supervision module 304 may compute a labeling function that includes vector data points that pertain to starting point numeric values associated with the number of times each of the one or more regularly visited locations such as the home location of the vehicle occupant may be utilized as starting points at particular timeframes (e.g., as the vehicle 102 may have the utilized the home location the highest number of times during certain timeframes, such as morning or evenings).

It is appreciated that the GAN training application 106 may compute additional labeling functions based on various categories of cleaned trip label data that may be further inputted to the GAN 104 to train the deep neural network(s) 108. However, for purposes of simplicity, this disclosure describes the aforementioned categories of the plurality of labeling functions that may be further analyzed by the GAN 104 to train the deep neural network(s) 108.

The method 500 may proceed to block 506, wherein the method 500 may include inputting the plurality of labeling functions to the label matrix 212. In one embodiment, the label matrix 212 that may store all of the labeling functions 208 respectively. Accordingly, the label matrix 212 may include results of each of the labeling functions respectively. The label matrix 212 may enable efficient learning of overlaps between various labeling functions.

The method 500 may proceed to block 508, wherein the method 500 may include inputting the plurality of labeling functions from the label matrix 212 to the generative model of the GAN 104. In an exemplary embodiment, upon determining the plurality of labeling functions (as discussed with respect to block 504), the weak supervision module 304 may communicate respective data to the generative module 306 of the GAN training application 106. The generative module 306 may be configured to input the plurality of labeling functions to the generative model 214 of the GAN 104 to model a distribution of individual classes by combining the plurality of labeling functions into probabilistic labels. The generative model 214 may build data instances in the form of two or more classes and distribute coordinates to the classes by aggregating data points associated with the plurality of labeling functions.

In one configuration, the generative model 214 may assign and utilize two classes as "regularly visited location" or "not regularly visited location" with respect to the probability associated with the location of the vehicle 102 being at the regularly visited location or not being located at the regularly visited location. For example, the generative model 214 may assign and utilize two classes as "home" or "not home" with respect to the probability associated with the location of the vehicle 102 being at the home location of the vehicle occupant or not being located at the home location of the vehicle occupant. Accordingly, the generative module 306 may input the plurality of labeling functions to the generative model 214 and may take a weighted sum of the data points of the plurality of labeling functions to output probabilistic labels that may be associated with one of the two classes.

The generative model 214 thereby allows the accuracies of weak supervision sources to be learned without access to ground truth. Additionally, the generative model 214 also enables the learning of correlations and other statistical dependences among sources and correlates for dependencies in labeling functions that may skew estimated accuracies. Stated differently, instead of relying on ground truth data, the generative model 214 learns from agreements and disagreements of data points that pertain to the plurality of labeling functions. In one or more embodiments, the generative module 306 may be configured to receive one or more sets of probabilistic labels that may be output by the generative model and may communicate respective data to the discriminative module 308 of the GAN training application 106.

With continued reference to the method 500, of FIG. 5, the method 500 may proceed to block 510, wherein the method 500 may include inputting the output of the generative model 214 to the discriminative model of the GAN 104. In an exemplary embodiment, the discriminative module 308 may input the set(s) of probabilistic labels to the discriminative model 216 of the GAN 104 to train a wide variety of machine learnings models, such as the deep neural network(s) 108. In particular, upon receiving the probabilistic labels associated with the two classes, the discriminative model 216 may be configured to learn a boundary between the two classes.

The discriminative model 216 may thereby output the likeliness of a label applying to an instance by utilizing the class probability labels to improve unlabeled data and by using estimated labels to train the unlabeled data over cross-model settings over various sets of features. Accordingly, the discriminative module 308 may be configured to train the deep neural network(s) 108 to identify the regularly visited location of the vehicle occupant and utilize such identification for various purposes.

Figure 6:
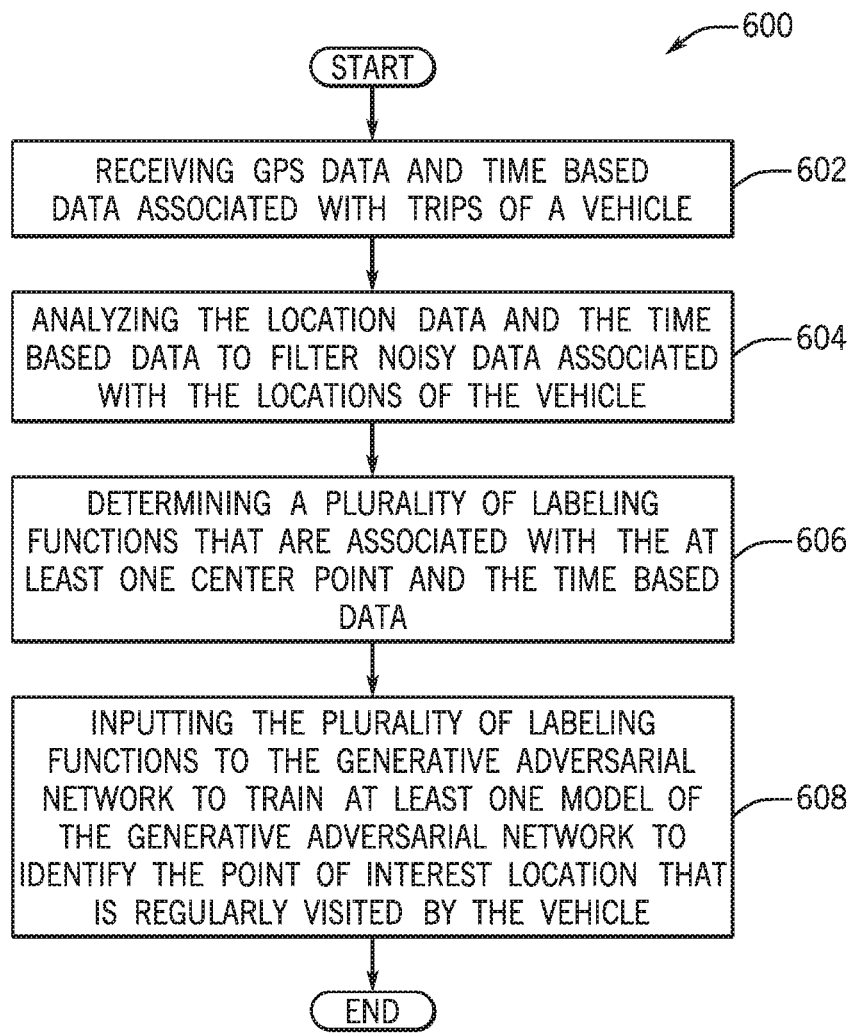
FIG. 6 is a process flow diagram of a method for utilizing weak supervision and a generative adversarial network to identify a point of interest location according to an exemplary embodiment of the present disclosure.

FIG. 6 is a process flow diagram of a method 600 for utilizing weak supervision and a generative adversarial network to identify a point of interest location according to an exemplary embodiment of the present disclosure. FIG. 6 will be described with reference to the components of FIG. 1, FIG. 2, and FIG. 3, through it is to be appreciated that the method 60 of FIG. 5 may be used with other systems/components. The method 600 may begin at block 602, wherein the method 600 may include receiving location data and time based data associated with locations of a vehicle 102.

The method 600 may proceed to block 604, wherein the method 600 may include analyzing the location data and the time based data to filter noisy data associated with the locations of the vehicle 102. In one embodiment, at least one center point that is associated with a point of interest location that is regularly visited by the vehicle is determined and utilized for weak supervision. The method 600 may proceed to block 606, wherein the method 600 may include determining a plurality of labeling functions that are associated with the at least one center point and the time based data. The method 600 may proceed to block 608, wherein the method 600 may include inputting the plurality of labeling functions to the GAN 104 to train at least one model of the GAN 104 to identify the point of interest location that is regulated visited by the vehicle 102.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for utilizing weak supervision and a generative adversarial network to identify a location, comprising:
   receiving location data and time based data associated with locations of a vehicle;
   analyzing the location data and the time based data to filter noisy data associated with the locations of the vehicle, wherein at least one center point that is associated with a point of interest location that is regularly visited by the vehicle is determined and utilized for weak supervision;
   determining a plurality of labeling functions that are associated with the at least one center point and the time based data; and
   inputting the plurality of labeling functions to the generative adversarial network to train at least one model of the generative adversarial network to identify the point of interest location that is regularly visited by the vehicle.

2. The computer-implemented method of claim 1, wherein receiving the location data and the time based data associated with locations of the vehicle include storing locational coordinates associated with a parking location of the vehicle and time stamps that are associated with a timeframe when the vehicle is parked at the parking location and when the vehicle departs from the parking location to a trip log.

3. The computer-implemented method of claim 2, wherein analyzing the location data and the time based data to filter the noisy data includes analyzing records associated with the locational coordinates for a plurality of parking locations of the vehicle to determine data points that include locational coordinates that are associated with parking locations that are located near locations that are regularly visited by the vehicle.

4. The computer-implemented method of claim 3, wherein analyzing the location data and the time based data to filter the noisy data includes filtering outlier data points that include locational coordinates that are associated with parking locations that are located near locations that are not regularly visited by the vehicle.

5. The computer-implemented method of claim 4, wherein analyzing the location data and the time based data to filter the noisy data includes reducing a spatial data set size of data points that include locational coordinates that are associated with parking locations that are located near locations that are regularly visited by the vehicle, wherein the at least one center point of at least one cluster of the reduced data set size of data points is determined for the point of interest location that is regularly visited by the vehicle.

6. The computer-implemented method of claim 5, wherein determining the plurality of labeling functions that are associated with the at least one center point and the time based data includes analyzing the at least one center point and additional center points associated with parking locations that are located near locations that are regularly visited by the vehicle to determine the plurality of labeling functions.

7. The computer-implemented method of claim 6, wherein inputting the plurality of labeling functions to the generative adversarial network includes inputting the plurality of labeling functions to a generative model of the generative adversarial network, wherein the generative model may assign a plurality of classes that may be associated with the location of the vehicle with respect to the point of interest location.

8. The computer-implemented method of claim 7, wherein inputting the plurality of labeling functions to the generative adversarial network includes utilizing the generative model to output probabilistic labels associated with the plurality of classes based on the plurality of labeling functions.

9. The computer-implemented method of claim 8, further including inputting the plurality of probabilistic labels to a discriminative model of the generative adversarial network, wherein the discriminative model utilizes the probabilistic labels to improve unlabeled data by using estimated labels to train the unlabeled data, wherein a deep neural network is trained to identify the point of interest location that is regularly visited by the vehicle.

10. A system for utilizing weak supervision and a generative adversarial network to identify a location, comprising:
a memory storing instructions when executed by a processor cause the processor to:
receive location data and time based data associated with locations of a vehicle;
analyze the location data and the time based data to filter noisy data associated with the locations of the vehicle, wherein at least one center point that is associated with a point of interest location that is regularly visited by the vehicle is determined and utilized for weak supervision;
determine a plurality of labeling functions that are associated with the at least one center point and the time based data; and
input the plurality of labeling functions to the generative adversarial network to train at least one model of the generative adversarial network to identify the point of interest location that is regularly visited by the vehicle.

11. The system of claim 10, wherein receiving the location data and the time based data associated with locations of the vehicle include storing locational coordinates associated with a parking location of the vehicle and time stamps that are associated with a timeframe when the vehicle is parked at the parking location and when the vehicle departs from the parking location to a trip log.

12. The system of claim 11, wherein analyzing the location data and the time based data to filter the noisy data includes analyzing records associated with the locational coordinates for a plurality of parking locations of the vehicle to determine data points that include locational coordinates that are associated with parking locations that are located near locations that are regularly visited by the vehicle.

13. The system of claim 12, wherein analyzing the location data and the time based data to filter the noisy data includes filtering outlier data points that include locational coordinates that are associated with parking locations that are located near locations that are not regularly visited by the vehicle.

14. The system of claim 13, wherein analyzing the location data and the time based data to filter the noisy data includes reducing a spatial data set size of data points that include locational coordinates that are associated with parking locations that are located near locations that are regularly visited by the vehicle, wherein the at least one center point of at least one cluster of the reduced data set size of data points is determined for the point of interest location that is regularly visited by the vehicle.

15. The system of claim 14, wherein determining the plurality of labeling functions that are associated with the at least one center point and the time based data includes analyzing the at least one center point and additional center points associated with parking locations that are located near locations that are regularly visited by the vehicle to determine the plurality of labeling functions.

16. The system of claim 15, wherein inputting the plurality of labeling functions to the generative adversarial network includes inputting the plurality of labeling functions to a generative model of the generative adversarial network, wherein the generative model may assign a plurality of classes that may be associated with the location of the vehicle with respect to the point of interest location.

17. The system of claim 16, wherein inputting the plurality of labeling functions to the generative adversarial network includes utilizing the generative model to output probabilistic labels associated with the plurality of classes based on the plurality of labeling functions.

18. The system of claim 17, further including inputting the plurality of probabilistic labels to a discriminative model of the generative adversarial network, wherein the discriminative model utilizes the probabilistic labels to improve unlabeled data by using estimated labels to train the unlabeled data, wherein a deep neural network is trained to identify the point of interest location that is regularly visited by the vehicle.

19. A non-transitory computer readable storage medium storing instructions that when executed by a computer, which includes a processor perform a method, the method comprising:
    receiving location data and time based data associated with locations of a vehicle;
    analyzing the location data and the time based data to filter noisy data associated with the locations of the vehicle, wherein at least one center point that is associated with a point of interest location that is regularly visited by the vehicle is determined and utilized for weak supervision;
    determining a plurality of labeling functions that are associated with the at least one center point and the time based data; and
    inputting the plurality of labeling functions to a generative adversarial network to train at least one model of the generative adversarial network to identify the point of interest location that is regularly visited by the vehicle.

20. The non-transitory computer readable storage medium of claim 19, further including inputting a plurality of probabilistic labels to a discriminative model of the generative adversarial network, wherein the discriminative model utilizes the probabilistic labels to improve unlabeled data by using estimated labels to train the unlabeled data, wherein a deep neural network is trained to identify the point of interest location that is regularly visited by the vehicle.

\* \* \* \* \*